(12) United States Patent
Hanson et al.

(10) Patent No.: US 8,162,190 B2
(45) Date of Patent: Apr. 24, 2012

(54) ERGONOMIC LIFT MECHANISM FOR A TRUCK BOX

(75) Inventors: Jim Hanson, Cortland, IL (US); Ajay Utpat, Pune (IN); Pravin Lokhande, Pune (IN)

(73) Assignee: Knaack LLC, Crystal Lake, IL (US)

( * ) Notice: Subject to any disclaimer, the term of this patent is extended or adjusted under 35 U.S.C. 154(b) by 832 days.

(21) Appl. No.: 12/249,037

(22) Filed: Oct. 10, 2008

(65) Prior Publication Data

US 2010/0051662 A1   Mar. 4, 2010

(30) Foreign Application Priority Data

Aug. 29, 2008   (IN) .......................... 1827/MUM/2008

(51) Int. Cl.
*B60R 9/00* (2006.01)
(52) U.S. Cl. ...................................... 224/404; 296/37.6
(58) Field of Classification Search .................. 224/404; 296/37.6; 312/127, 130, 270.1, 271
See application file for complete search history.

(56) References Cited

U.S. PATENT DOCUMENTS

| | | | | |
|---|---|---|---|---|
| 2,570,636 A | * | 10/1951 | Bolling | 312/241 |
| 2,814,545 A | * | 11/1957 | Cornish | 312/271 |
| 4,936,624 A | | 6/1990 | West | |
| 5,909,921 A | * | 6/1999 | Nesbeth | 296/100.1 |
| RE36,379 E | | 11/1999 | Slivon et al. | |
| 6,077,024 A | | 6/2000 | Trueblood | |
| D436,342 S | | 1/2001 | Lopez | |
| 6,212,827 B1 | * | 4/2001 | Miller | 49/345 |
| 6,464,095 B2 | | 10/2002 | Samsel | |
| 6,467,830 B1 | | 10/2002 | Cortright | |
| 6,929,303 B1 | | 8/2005 | Sharples | |
| 7,182,177 B1 | | 2/2007 | Simnacher | |
| 2002/0089202 A1 | | 7/2002 | Henderson | |
| 2004/0207226 A1 | | 10/2004 | Johnson | |

FOREIGN PATENT DOCUMENTS

EP   0753383 B1   12/2000

OTHER PUBLICATIONS

Better Built, "Crown Series Gullwing Box", Retrieved Online Apr. 28, 2008 from http://www.dawsbetterbuilt.com/bbt/gullwing.html.
Contico, A Division of Continental Commercial Products, LLC "Tradesman Quality Truck Tool Boxes and Specialty Products", Mar. 20, 2006.

(Continued)

*Primary Examiner* — Justin Larson
(74) *Attorney, Agent, or Firm* — McDonnell Boehnen Hulbert & Berghoff LLP (57) ABSTRACT

A lifting mechanism for a toolbox contained in a truck box is provided. The lifting mechanism may include an outer truck box having a cover, an inner toolbox, and a tray that supports the inner box. A connecting link is coupled to the cover and to the tray for guiding the inner box between an elevated position and a lowered position. A lift assist, such as a gas spring, is coupled to the cover for lifting the inner box when the cover is opened and lowering the inner box when the cover is closed. In another embodiment, the lifting mechanism may comprise an L-shaped slotted link mounted to the cover and to the tray for guiding the inner box between the elevated position and the lowered position.

30 Claims, 12 Drawing Sheets

OTHER PUBLICATIONS

DeeZee (2007), "8695B" Retrieved Online Apr. 28, 2008 from http://deezee.r-catalog.com/.

Adrian Steel "Cargo Management Solutions for Commercial Vehicles" Retrieved Online Apr. 28, 2008 from http://www.adriansteel.com/index.php?branch=store&view=products&parent=31.

Pro-Tech Industries "Cross Body Toolboxes" Retrieved Online Apr. 28, 2008 from http://www.protech.net/gallery.php? gallery=9.

RKI "Commercial Grade Truck Equipment" Retrieved Online Apr. 28, 2008 from http://www.rki-us.com/products.aspx? catid=11.

UWS "Gullwig Boxes" Retrieved Online Apr. 28, 2008 from http://www.uwsta.com/blue_gullwig.html.

International Search Report from PCT/US2009/054253 mailed Oct. 29, 2009.

\* cited by examiner

ERGONOMIC LIFT MECHANISM FOR A TRUCK BOX

PRIORITY

This application claims priority to Indian application No. 1827/MUM/2008 filed on Aug. 29, 2008.

BACKGROUND

1. Field of the Application

This invention relates to the field of storage containers for vehicles. More particularly, the invention relates to a mechanism for ergonomically lifting a toolbox or equipment from a storage box that is located in an area that is difficult to reach.

2. Description of the Related Art

Storage devices, more particularly truck boxes, are commonly used with pickup trucks and vary in size, shape, finish, and efficiency. They are typically designed to integrate to the contours and cavities present in pick-up truck beds and are used to store and transport tools, hardware, and equipment used for various projects. Because the truck boxes are often located in places that are difficult to reach, such as the bed of a truck, it may be hard to access the contents of the box without climbing into the truck bed.

Further, toolboxes are usually heavy due to the contents they carry. As a result of the weight and the hard-to-reach location of the truck box in the truck bed, it is often difficult for a person to pull the toolbox or contents of the toolbox from the truck box.

It would be advantageous, therefore, to provide a mechanism for lifting the contents of the truck box to facilitate the removal of the contents by a user.

These as well as other aspects and advantages will become apparent to those of ordinary skill in the art by reading the following detailed description, with reference where appropriate to the accompanying drawings. Further, it should be understood that the embodiments described in this summary and elsewhere are intended to illustrate the invention by way of example only.

SUMMARY

In one embodiment, the present application provides a truck box assembly including an outer box having a cover and a lifting mechanism. The lifting mechanism includes a tray that supports the inner box, a first bracket mounted to a bottom of the outer box to allow the inner box to move between an elevated position and a lowered position, and a link coupled to the cover and to the tray for guiding the tray between the elevated position and the lowered position. The lifting mechanism may also include a lift assist coupled to the cover to assist in lifting and lowering the tray.

In yet another embodiment, the lifting mechanism comprises an L-shaped slotted link coupled to the first bracket and to the tray for guiding the tray between an elevated position and a lowered position.

BRIEF DESCRIPTION OF THE DRAWINGS

Exemplary embodiments of the invention are described herein with reference to the drawings, in which.

DETAILED DESCRIPTION

Figure 1:
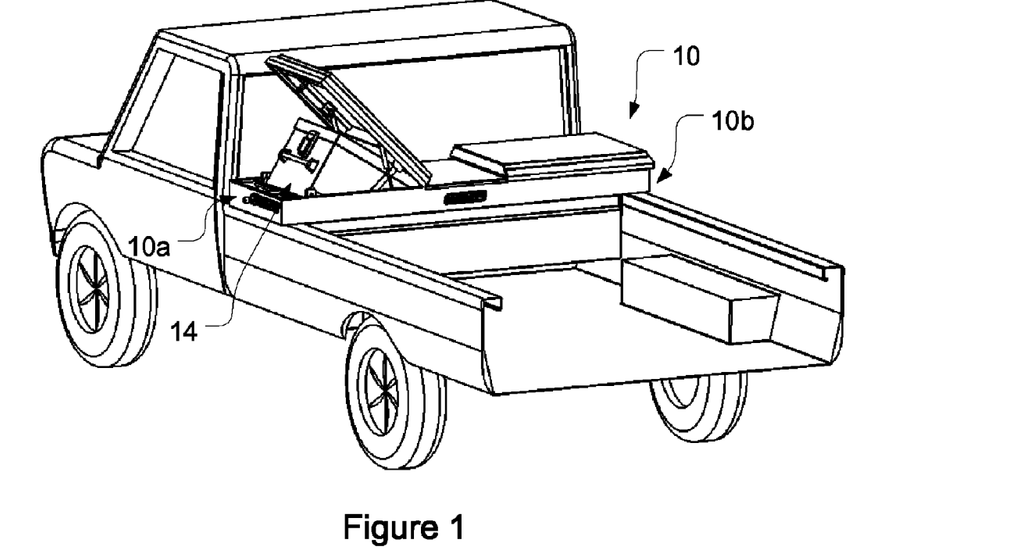
FIG. 1 is a perspective view of a pickup truck including a truck box having an ergonomic lift mechanism of the present invention.

Truck boxes, such as truck box 10 shown in FIG. 1, are generally mounted in the bed of a pickup truck to store tools and other jobsite accessories. The truck box 10 has two horizontal ledges 10a, 10b which rest on opposite side rails of the bed of the truck to secure the truck box in place.

Figure 2:
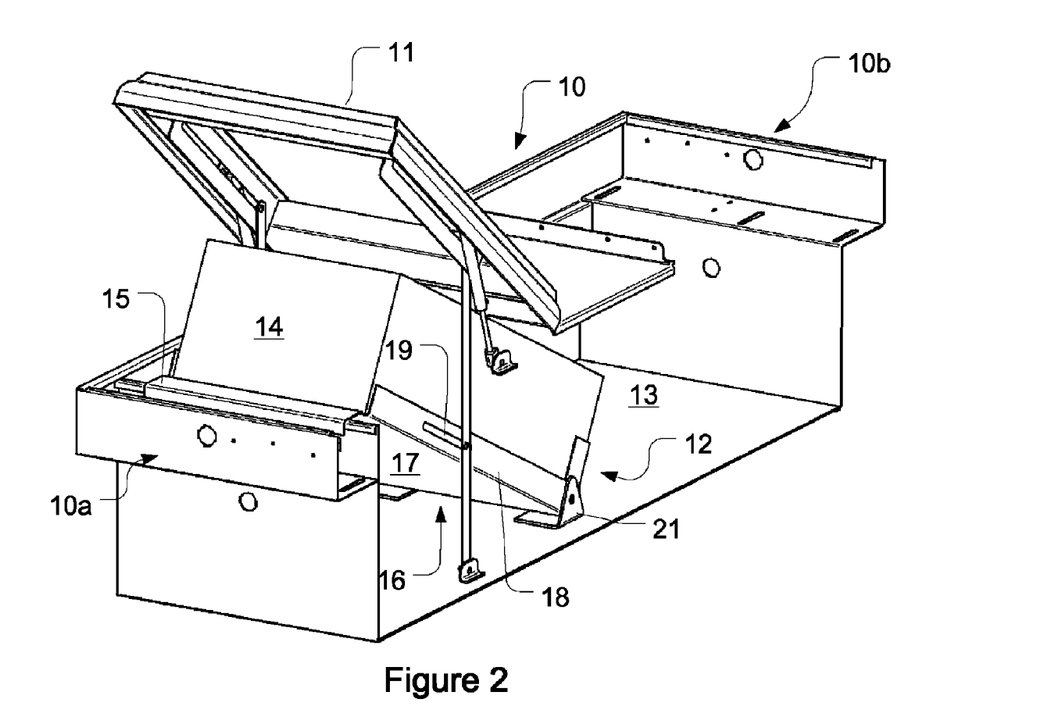
FIG. 2 is a perspective view of one embodiment of a truck box having an ergonomic lift mechanism of the present invention.

Referring to FIG. 2, a first embodiment of an outer box, such as a truck box 10, including an ergonomic lifting mechanism, generally indicated at 12, is shown in an open position. The truck box 10 has a cover 11, and an inner container or box, such as a toolbox 14, located inside. The toolbox 14 may hold tools or any other type of equipment to be used at a jobsite. In the open position, the toolbox 14 is supported by a tray 16 which is part of the lifting mechanism 12, the tray 16 being at an angle with respect to a bottom floor 13 of the truck box 10. The angle of the toolbox 14 in the open position may be in the range of approximately 25° to approximately 35°. In the closed position, the angle may be in the range of approximately 10° to approximately 15°.

The tray 16 may comprise a bottom portion 17 and at least one upstanding side portion 18 to support the toolbox 14. The tray 16 may further include a slot 19 on the upstanding side portion 18. The tray 16 may also include a second upstanding side portion (not shown) having a second slot (not shown) located opposite the upstanding side portion 18. The tray 16 may further include a back portion 20. A bracket 15 may be positioned between the horizontal ledge 10a and the tray 16 to facilitate the guiding of the toolbox 14 in and out of the tray 16.

Figure 3:
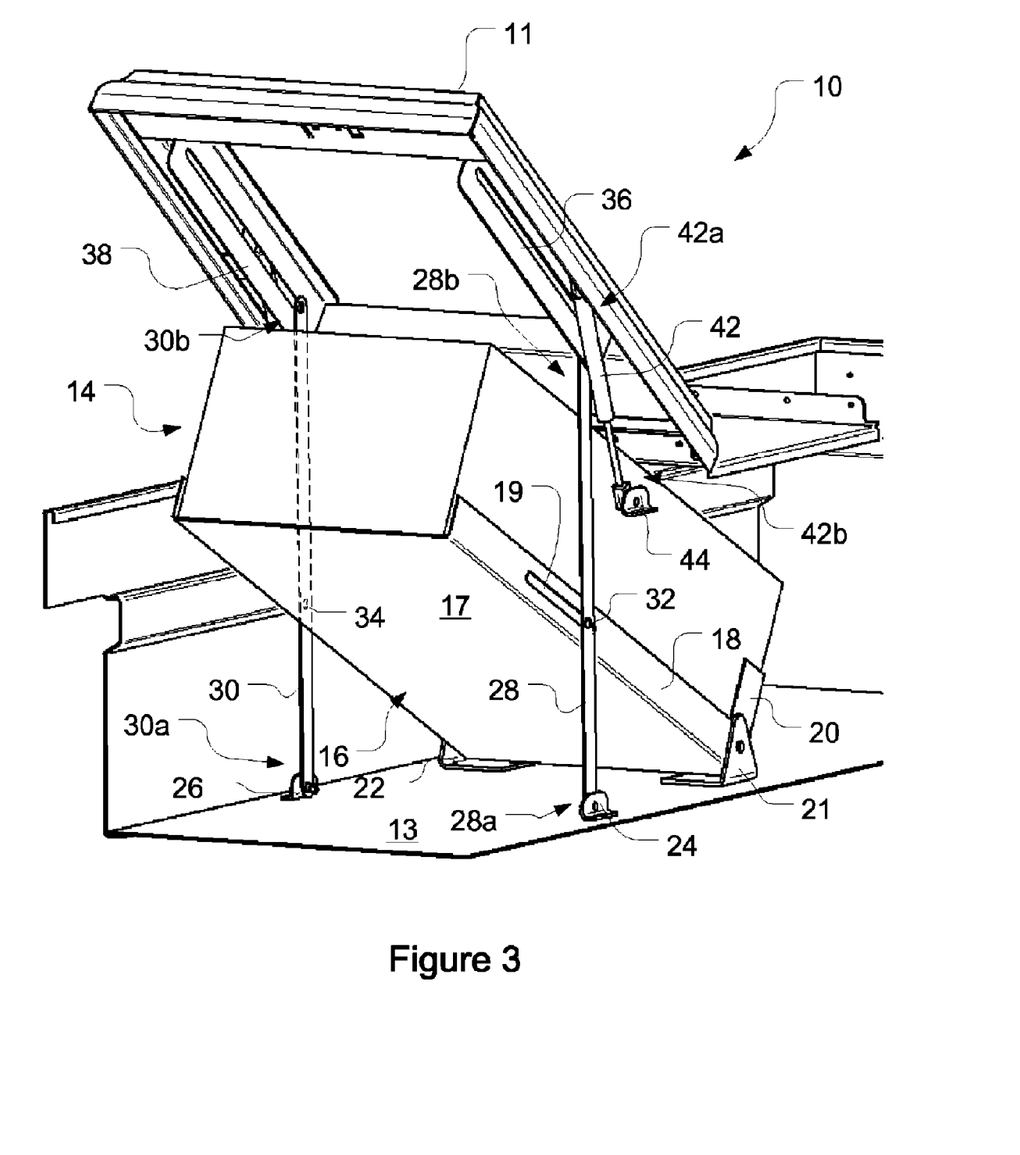
FIG. 3 is a perspective view of the mechanism shown in FIG. 2 with a portion of the truck box cut away.

The lifting mechanism 12 further comprises a plurality of pivots mounted to a bottom floor 13 of the truck box 10, as shown in FIG. 3. The pivots may include a first pair of brackets 21, 22 which support the back portion 20 of the tray 16 at a first end. Each bracket 21, 22 is provided with a pin that allows the tray 16 to pivot with respect to the brackets 21, 22. The plurality of pivots further may include a second pair of brackets 24, 26 which support a second end of the tray, located at a distance away from the first end. Each of the brackets 21, 22, 24, and 26 are mounted to the bottom floor 13 of the truck box 10 by any known suitable fastening mechanism, such as by welding, for example, or the use of bolts, as another example. The first pair of brackets 21, 22 may have a triangular shape. Alternatively, the first pair of brackets may be any other type of known bracket.

Each bracket of the second pair of brackets 24, 26 is coupled to one end 28a, 30a of respective connecting links 28 and 30 so as to allow the links to pivot with respect to the bracket. Such a coupling can be achieved by the use of a pin provided on the bracket.

The connecting links 28, 30 each are provided with a pin 32, 34. The pin 32, 34 may slide along the slots 19 in the upstanding side portions 18 of the tray 16 to allow for movement of the tray between its two positions.

The other end 28b, 30b of each connecting link 28, 30 is slidably secured to a respective slotted bracket 36, 38 located on an underside of the cover 11 of the truck box 10. The slotted brackets 36, 38 may be welded to the cover, or alternatively, may be secured to the cover by any known fastening mechanism. As the cover 11 is opened and closed, the connecting links 28, 30 slide along respective slotted brackets 36, 38 and slots 19 on the upstanding side portions 18 of the tray 16 to lift and lower the toolbox 14.

Figure 4:
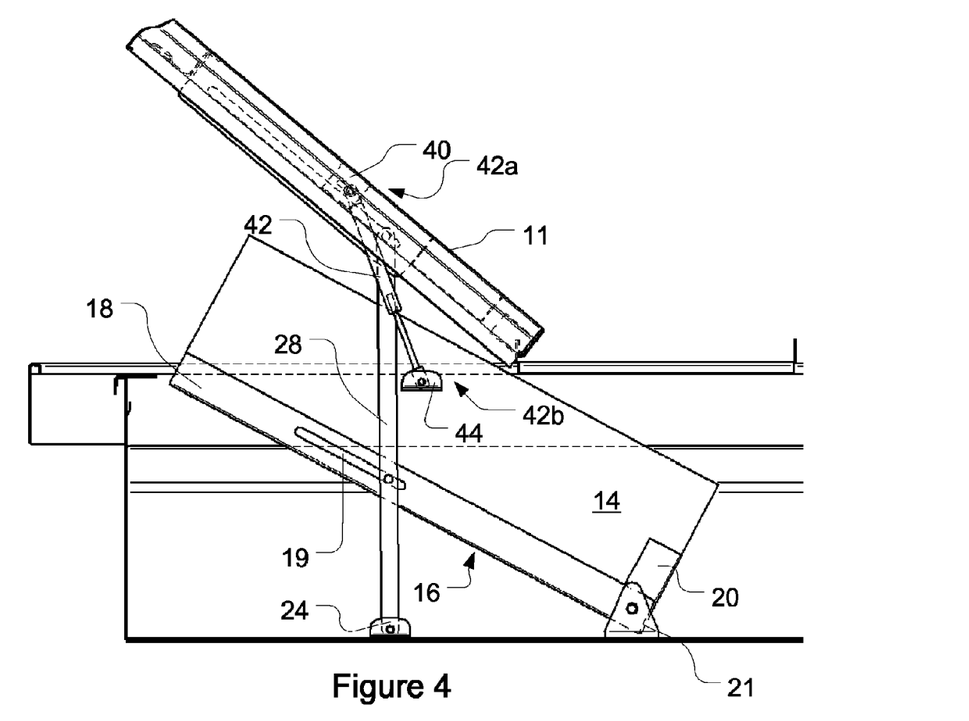
FIG. 4 is a side view of the mechanism shown in FIG. 2 in the open position.

A third bracket 40 may be secured to the underside of the cover 11, as shown in FIG. 4. The third bracket is coupled to one end 42a of a lift assist, which may be in the form of a gas spring 42. Other known lift assist mechanisms which may be used include a compression spring, a tension spring, a pneumatic cylinder, or a hydraulic cylinder, for example. The gas spring 42 is preferably a double acting gas spring; one such suitable gas spring is manufactured by STABILUS. The other end 42b of the gas spring 42 may be secured to the truck box 10 at fixed pivot 44.

The gas spring 42 assists in lifting the toolbox 14 when the cover 11 is opened and in lowering the toolbox 14 when the cover 11 is closed. As the cover 11 is opened and spring end 42a begins to move upwardly, gas spring 42 applies a force (ranging between approximately 53 lbs. to approximately 98 lbs.) to extend the spring from its compressed position. In order for the cover 11 to stay open, gas spring 42 applies a force (ranging between approximately 22 lbs. to approximately 32 lbs.) to keep the gas spring in the extended position. Thus, the cover 11 remains open until it is acted upon by an external force in the opposite direction. When the external force in the opposite direction, such as a force applied by a user, exceeds the force of the gas spring, the gas spring 42 begins to retract back to its compressed position.

A second gas spring (shown in part in FIG. 2) having a similar configuration and mounting arrangement as gas spring 42 may also be located opposite the gas spring 42 on the truck box 10 to assist in lifting and lowering the toolbox 14.

Figure 5:
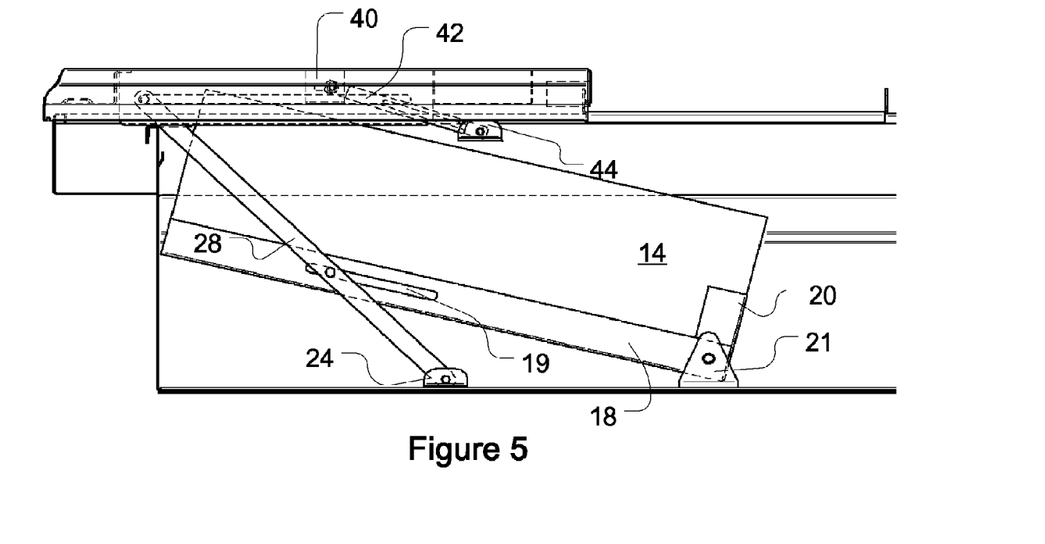
FIG. 5 is a side view of the mechanism shown in FIG. 2 in the closed position.

In operation, when the cover 11 of truck box 10 is in a closed position, as shown in FIG. 5, the toolbox 14 is in a lowered position and secured inside of the truck box. When the cover 11 is opened, as shown in FIG. 4, the toolbox 14 is lifted up to an elevated position by the lifting mechanism 12 and exposed for easy access. In the elevated position, the toolbox 14 can easily be pulled out of the truck box 10 and loaded back into the truck box.

As the user opens the cover 11, the gas spring 42 is caused to move to its extended position. As understood by those skilled in the art, the gas stored within the cylinder of the gas spring pushes against the one side of the piston of the gas spring, causing the cylinder to move away from the piston. This movement assists in the opening of the cover 11 and the lifting of the tray 16 and the toolbox 14 carried thereon from the lowered, stowed position to the upward, elevated position. The force of the gas spring 42 keeps the spring in the extended position and keeps the cover 11 in the open position. The second gas spring works as gas spring 42 to aid in lifting the cover 11 and keeping the cover 11 in the open position.

Further, as the cover 11 is opened, one end 28b, 30b of each link 28, 30 is lifted and slides along respective slotted brackets 36, 38. This causes pins 32, 34 to travel along the slots 19 in the upstanding side portions 18 of the tray 16, thereby causing the bottom portion 17 and the back portion 20 of the tray 16 to pivot about the first pair of brackets 21, 22 and rotate the toolbox 14 on an angle into an elevated position. The angle may be in the range of approximately 25° to approximately 35° in the open position. With the tray at this elevated position, the user can remove the toolbox.

When the user pushes on the cover 11 to move it back into the closed position, the gas spring 42 moves to its compressed position. As understood by those skilled in the art, the gas stored within the cylinder of the gas spring pushes against the other side of the piston of the gas spring, causing the cylinder to move towards the piston. The return of the cover 11 to its closed position causes the connecting links 28, 30 to lower and slide back along respective slotted brackets 36, 38 and slots 19 in the upstanding side portions 18 of the tray 16. The toolbox 14 is thereby lowered back inside the truck box 10.

Figure 6:
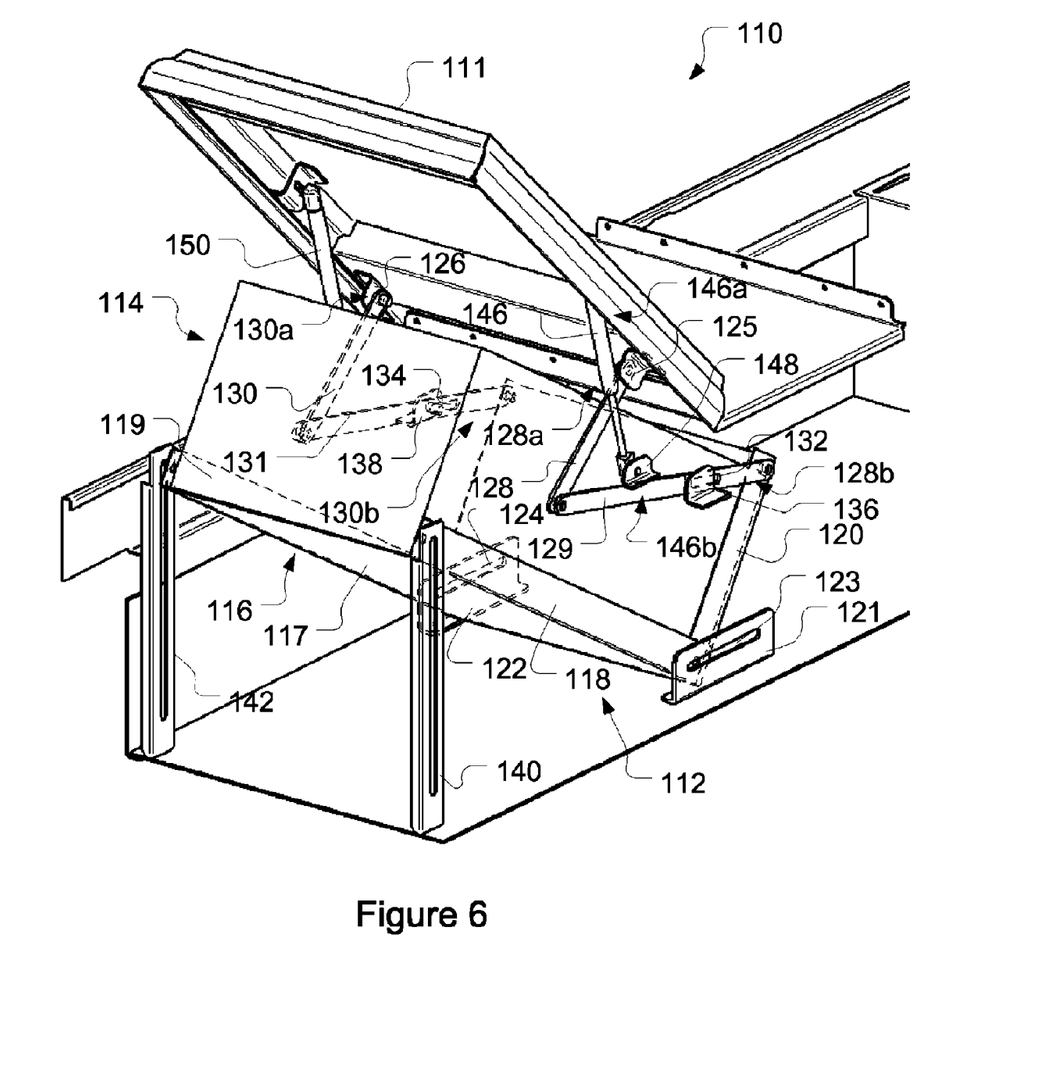
FIG. 6 is a perspective view of a second embodiment of a truck box having an ergonomic lift mechanism of the present invention.
Figure 7:
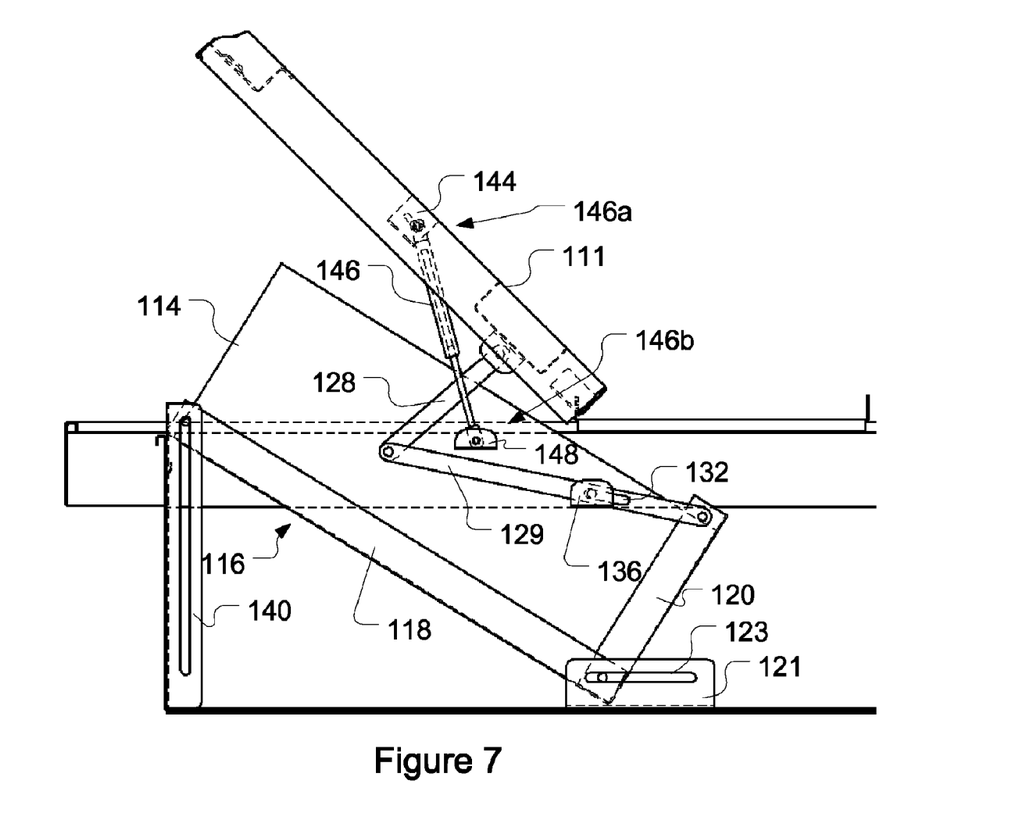
FIG. 7 is a side view of the mechanism shown in FIG. 6 in the open position.
Figure 8:
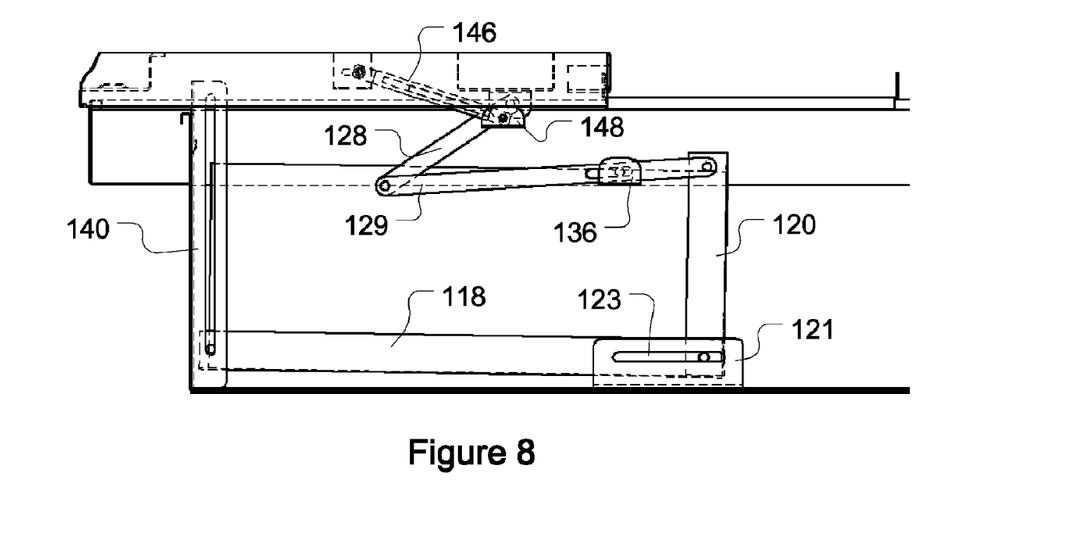
FIG. 8 is a side view of the mechanism shown in FIG. 6 in the closed position.

FIGS. 6-8 show a second embodiment of a lifting mechanism of the present application. In this embodiment, the lifting mechanism, generally indicated at 112, is located within truck box 110. The truck box 110 includes a cover 111. A toolbox 114 is located inside of the truck box 110 and is supported by a tray 116, the tray being at an angle in the open position. The angle of the toolbox 114 in the open position may be in the range of approximately 25° to approximately 35°. In the closed position, the angle may be in the range of approximately 0° to approximately 5°. The tray 116 may comprise a bottom portion 117 and at least one upstanding side portion 118 to support the toolbox 114. The tray 116 may further include a second upstanding side portion 119 located opposite the at least one upstanding side portion 118. The tray 116 may also include a back portion 120.

The lifting mechanism 112 further comprises a first pair of brackets 121, 122 mounted to a bottom of the truck box 110. The first pair of brackets 121, 122 may each include a slot 123, 124. Each upstanding side portion 118, 119 of the tray 116 is provided with a pin that interacts with slots 123, 124 to allow the tray to pivot and slide with respect to the brackets 121, 122.

A second pair of brackets 125, 126 may be secured to the underside of the cover 111. A first pair of connecting links 128, 130 may be secured at one end 128a, 130a to the second pair of brackets 125, 126. A second pair of connecting links 129, 131 may be connected to the other end of the first pair of connecting links 128, 130, and may also include slots 132, 134, respectively. A pair of fixed pivots 136, 138 may be provided on either side of the truck box 110. The fixed pivots 136, 138 are provided with a pin to interact with slots 132, 134 in the connecting links 129, 131. The other end 128b, 130b of connecting links 129, 131 may be pivotably mounted to the back portion 120 of the tray 116. In an alternative embodiment, only one link may be provided between the brackets 125, 126 and the back portion of the tray 120.

The lifting mechanism 112 further includes a pair of vertical slotted brackets 140, 142 attached to an end of the truck box 110 that is opposite the back portion 120 of the tray 116, as shown in FIG. 6. The slotted brackets 140, 142 may be welded to the side of the truck box 110, or alternatively, may be attached to the truck box 110 by any suitable attachment means. The tray 116 is moved along brackets 140, 142 via pins provided on upstanding side portions 118, 119 at one end of the tray.

A third bracket 144 may be mounted to the underside of the cover 111, as shown in FIG. 7. The third bracket 144 is coupled to one end 146a of a gas spring 146. The gas spring 146 has similar characteristics as gas spring 42 described above. The other end 146b of gas spring 146 may be secured to the truck box 110 at fixed pivot 148. The gas spring 146 assists in lifting the toolbox 114 when the cover 111 is opened and lowering the toolbox 114 when the cover is closed. A second gas spring 150 having a similar configuration and mounting arrangement as gas spring 146 may also be located opposite the gas spring 146 on the truck box 110 to assist in lifting and lowering the toolbox 114.

In operation, when the cover 111 of truck box 110 is in a closed position, as shown in FIG. 8, the toolbox 114 is in a lowered position and secured inside of the truck box. When the cover 111 is opened, as shown in FIG. 7, the toolbox 114 is lifted up to an elevated position by the lifting mechanism 112 and exposed for easy access. In the elevated position, the toolbox 114 can easily be pulled out of the truck box 110 and loaded back into the truck box.

As the user opens the cover 111, the gas spring 146 is caused to move to its extended position. As understood by those skilled in the art, the gas stored within the cylinder of the gas spring pushes against the one side of the piston of the gas spring, causing the cylinder to move away from the piston. This movement assists in the opening of the cover 111 and the lifting of the tray 116 and the toolbox 114 carried thereon from the lower, stowed position to the upward elevated position. The force of the gas spring 146 keeps the spring in the extended position and keeps the cover 111 in the open position. The second gas spring works as gas spring 146 to aid in lifting the cover 111 and keeping the cover 111 in the open position.

Further, as the cover 111 is opened, the connecting links 128, 130 move along with the cover 111, causing the links 129, 131 to move about the fixed pivots 136, 138. This in turn causes the links 129, 131 to act on the back portion 120 of the tray, which causes the tray to move along slots 123, 124 of the first pair of brackets 121, 122, and along the slots of the brackets 140, 142. This movement results in the tray 116 and the toolbox 114 being rotated on an angle into the elevated position. The angle may be in the range of approximately 25° to approximately 35° in the open position.

When the user pushes on the cover 111 to move it back into the closed position, the gas spring 146 assumes its compressed position. As understood by those skilled in the art, the gas stored within the cylinder of the gas spring pushes against the other side of piston of the gas spring, causing the cylinder to move towards the piston. The return of the cover 111 to its closed position causes the connecting links 128, 129, 130, 131 to be lowered and moved back to the original position. The downward motion of the connecting links 129, 131 is communicated to the back portion 120 of the tray 116, thereby causing the tray 116 to slide back along first pair of brackets 121, 122 and down the pair of vertical slotted brackets 140, 142. Thus, the toolbox 114 is lowered back inside the truck box 110.

Figure 9:
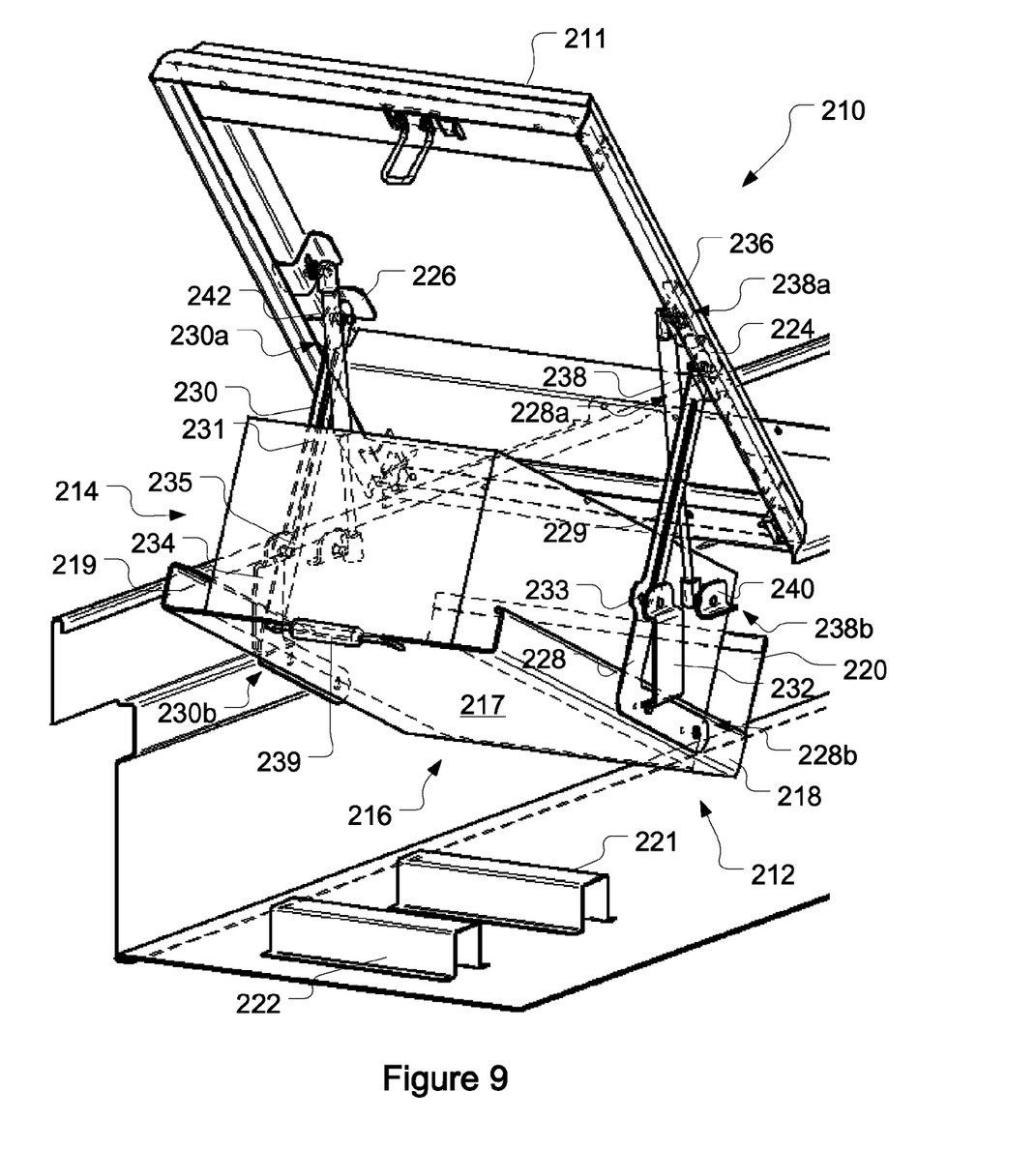
FIG. 9 is a perspective view of a third embodiment of a truck box having an ergonomic lift mechanism of the present invention.
Figure 10:
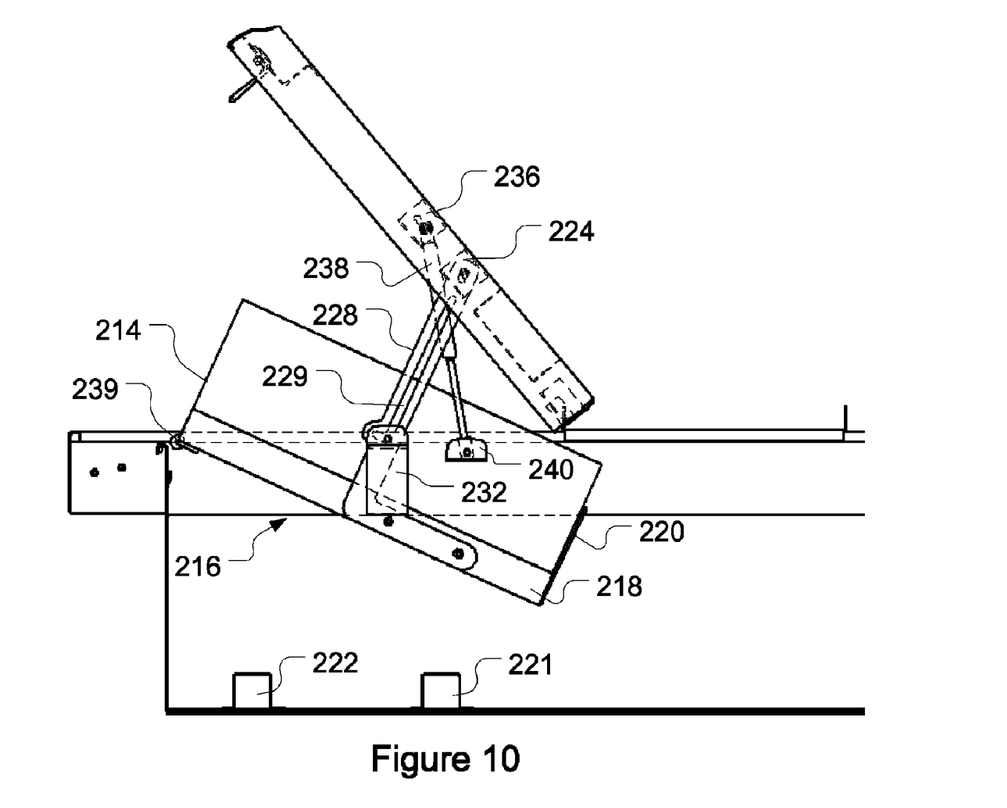
FIG. 10 is a side view of the mechanism shown in FIG. 9 in the open position.
Figure 11:
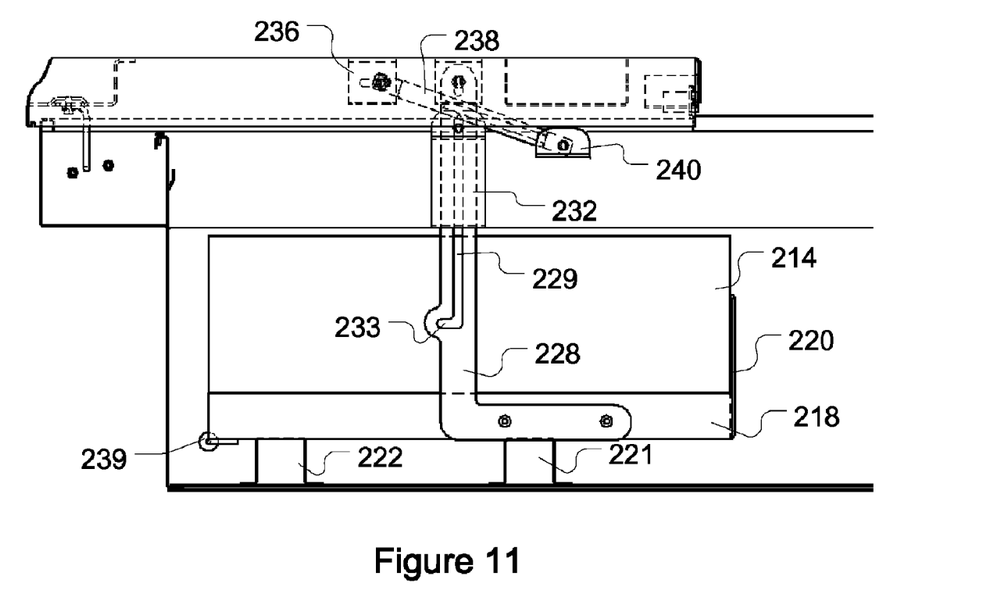
FIG. 11 is a side view of the mechanism shown in FIG. 9 in the closed position.

FIGS. 9-11 show a third embodiment of the lifting mechanism of the present application. In this embodiment, the lifting mechanism, generally indicated at 212, is located within truck box 210. The truck box 210 includes a cover 211. A toolbox 214 is located inside of the truck box 210 and is supported by a tray 216, the tray being at an angle with respect to a bottom of the truck box 210 in the open position. The angle of the toolbox 214 in the open position may be in the range of approximately 20° to approximately 30°. In the closed position, the angle of the toolbox 214 is approximately 0°.

The tray 216 may comprise a bottom portion 217 and at least one upstanding side portion 218 to support the toolbox 214. The tray 216 may further include a second upstanding side portion 219 located opposite the at least one upstanding side portion 218. The tray 216 may also include a back portion 220.

The lifting mechanism 212 further comprises a pair of supports 221, 222 positioned on a bottom of the truck box 210. The pair of supports 221, 222 may support the tray 216 when it is in a lowered position.

A first pair of brackets 224, 226 may be secured to the underside of the cover 211. A pair of connecting links 228, 230 may be secured at one end 228a, 230a to the first pair of brackets 224, 226. Each connecting link 228, 230 may be L-shaped with a longitudinal slot 229, 231 extending along one of its sections, and each of the slots including a locking mechanism 233, 235. The locking mechanism 233 can be best seen in FIG. 11. In a preferred embodiment, the locking mechanism constitutes an extension of the slot 229, 231, the extension being perpendicular to the axis that extends through the longitudinal slot. Of course, the locking mechanism may take alternate forms.

The third embodiment further includes a pair of fixed pivots 232, 234 may be provided on the truck box 210. The fixed pivots 232, 234 are operatively coupled by respective pins to the slots 229, 231 and locking mechanisms 233, 235 of the connecting links 228, 230. The other end 228b, 230b of each connecting link 228, 230 is secured to a respective upstanding side 218, 219 of the tray 216 by any suitable mounting means.

A second bracket 236 may be secured to the underside of the cover 211, as shown in FIG. 10. The second bracket 236 is coupled to one end 238a of a gas spring 238. The other end 238b of gas spring 238 may be secured to the truck box 210 at fixed pivot 240. The gas spring 238 assists in lifting the toolbox 214 when the cover 211 is opened and in lowering the toolbox 214 when the cover 211 is closed. When compared to the embodiments discussed above, this embodiment requires a gas spring of a higher capacity because the entire weight of the toolbox is carried by the cover.

The gas spring 238 assists in lifting the toolbox 214 when the cover 211 is opened and in lowering the toolbox 214 when the cover 211 is closed. As the cover 211 is opened and spring end 238a begins to move upwardly, gas spring 238 applies a force (ranging between approximately 60 lbs. and approximately 120 lbs.) to extend the spring from its compressed position. In order for the cover 211 to stay open, gas spring 238 applies a force (ranging between approximately 22 lbs. and approximately 32 lbs.) to keep the gas spring in the extended position. Thus, the cover 211 remains open until it is acted upon by an external force in the opposite direction. When the external force in the opposite direction, such as a force applied by a user, exceeds the force of the gas spring, the gas spring 238 begins to retract back to its compressed position.

A second gas spring 242 having a similar configuration and mounting arrangement as gas spring 238 may also be located opposite the gas spring 238 on the truck box 210 to assist in lifting and lowering the toolbox 214.

The tray 216 may include a roller/handle 239 over which the toolbox 214 can roll as a user pulls it off of the tray 216. The roller 239 assists in reducing the friction when rolling out the toolbox 214 from the tray 216.

In operation, when the cover 211 of truck box 210 is in a closed position, as shown in FIG. 11, the toolbox 214 is in a lowered position and secured inside of the truck box. When the cover 211 is opened, as shown in FIG. 10, the toolbox 214 is lifted up to an elevated position by the lifting mechanism 212 and exposed for easy access. In the elevated position, the toolbox 214 can easily be pulled out of the truck box 210 and loaded back into the truck box.

As the user opens the cover 211, the gas spring 238 is caused to move to its extended position. As understood by those skilled in the art, the gas stored within the cylinder of the gas spring pushes against the one side of the piston of the gas spring, causing the cylinder to move away from the piston. This movement assists in the opening of the cover 211 and the lifting of the tray 216 and the toolbox 214 carried thereon from the lower, stowed position to the upward elevated position. The force of the gas spring 238 keeps the spring in the extended position and keeps the cover 211 in the open position. The second gas spring 242 works as gas spring 238 to aid in lifting the cover 211 and keeping the cover 211 in the open position.

Further, as the cover opens, the connecting links 228, 230 move upwardly, past the fixed pivots 232, 234. Because the one end 228a, 230a of the connecting links 228, 230 is fixed to brackets 224, 226, and the pivots 232, 234 are fixed, the tray 216 is lifted to an elevated position in which it is at an angle with respect to the bottom of the truck box. The angle may be in the range of approximately 20° to approximately 30° in the open position.

When the cover 211 is fully opened, the locking mechanism 233, 235 may engage the fixed pivots 232, 234 to prevent accidental closure of the cover 211. The user may pull on the roller/handle 239 to disengage the locking mechanism 233, 235 of the connecting links 228, 230 from the fixed pivots. The cover 211 is then moved back into the closed position, and the gas spring 238 assumes its compressed position. The toolbox 214 then descends back inside the truck box 210 as the cover 211 is closed.

Figure 12:
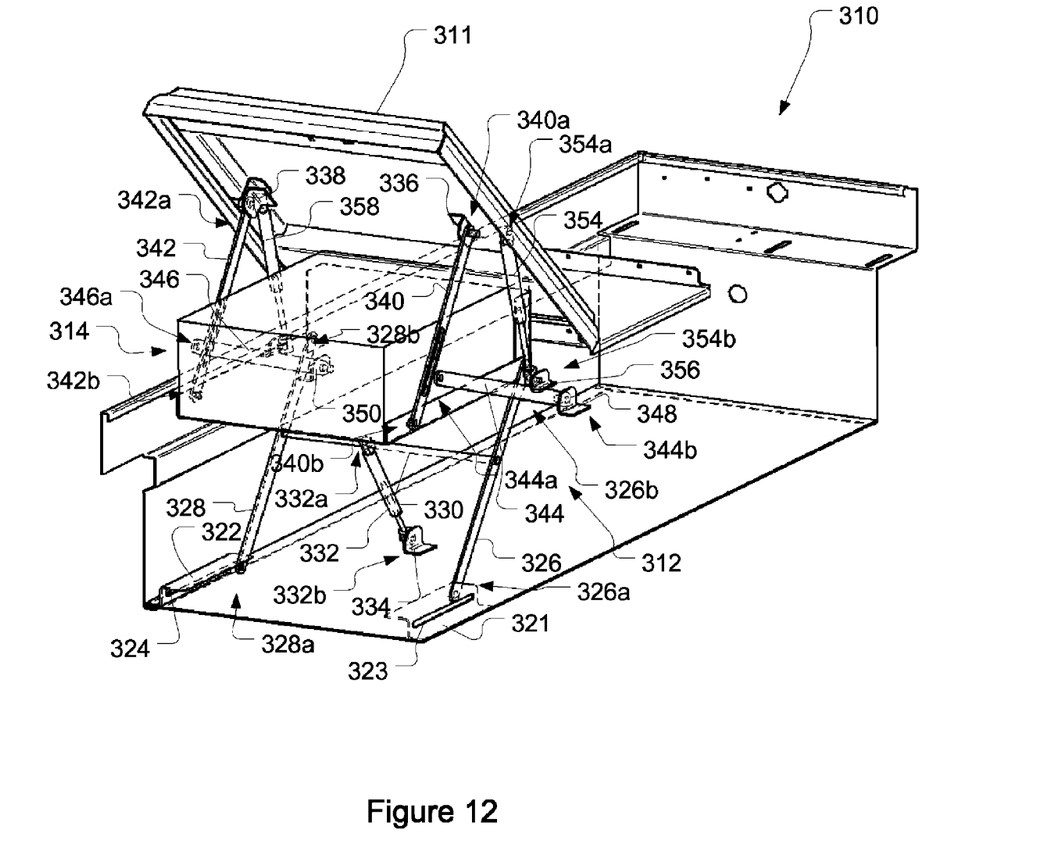
FIG. 12 is a perspective view of a fourth embodiment of a truck box having an ergonomic lift mechanism of the present invention.
Figure 13:
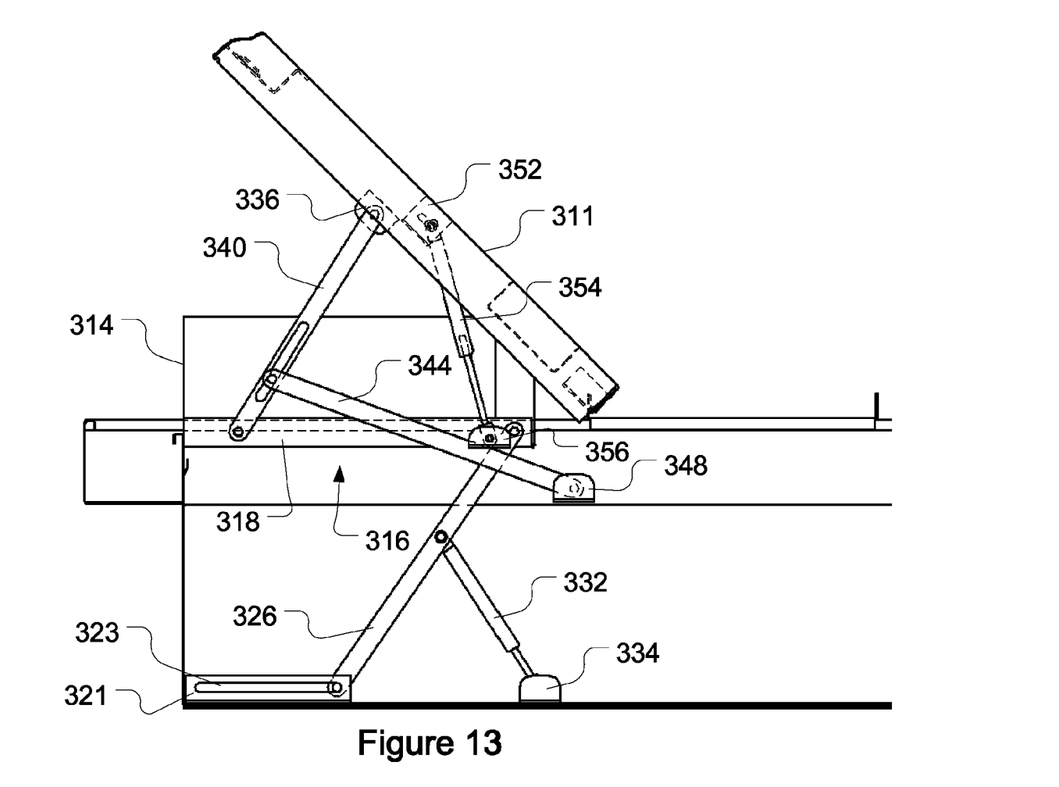
FIG. 13 is a side view of the mechanism shown in FIG. 12 in the open position.
Figure 14:
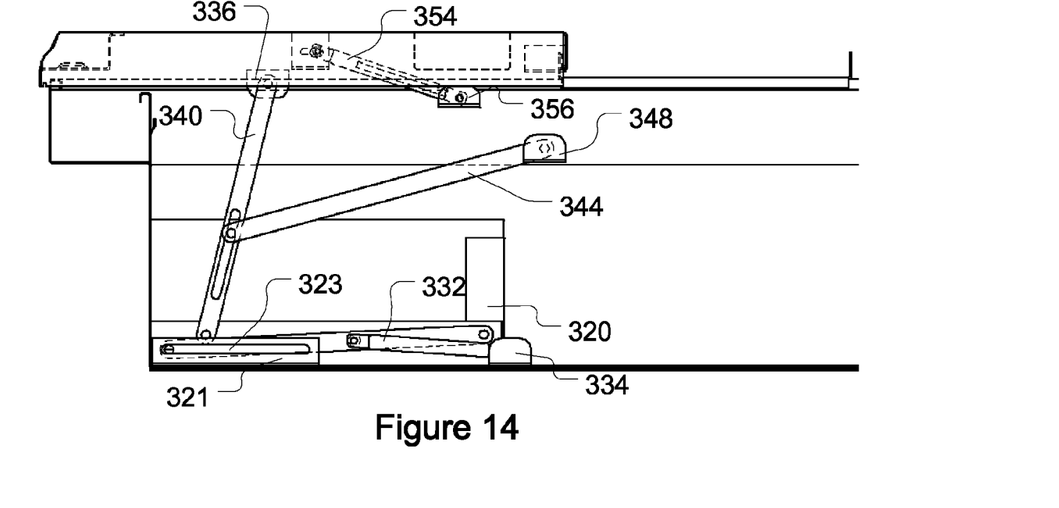
FIG. 14 is a side view of the mechanism shown in FIG. 12 in the closed position.

FIGS. 12-14 show a fourth embodiment of the lifting mechanism of the present application. In this embodiment, the lifting mechanism, generally indicated at 312, is located within truck box 310. The truck box 310 includes a cover 311. A toolbox 314 is located inside of the truck box 310 and is supported by a tray 316, which is best seen in FIGS. 13 and 14. The tray 316 may comprise a bottom portion (not shown) and at least one upstanding side portion 318 to support the toolbox 314. The tray 316 may further include a second upstanding side portion (not shown) located opposite the at least one upstanding side 318. The tray 316 may also include a back portion 320.

Referring to FIG. 12, the lifting mechanism 312 further comprises a first pair of brackets 321, 322 secured to a bottom of the truck box 310. The first pair of brackets 321, 322 may each include a slot 323, 324. Each of the first pair of brackets 321, 322 may be operatively coupled to one end 326a, 328a of a first pair of connecting links 326, 328 by a respective pin. The other end 326b, 328b of the connecting links 326, 328 is secured to the upstanding sides 318 of the tray 316. A stabilizing link 330 may be provided to connect the two connecting links 326, 328 and to provide stability to the links 326, 328.

A first gas spring 332 may be connected at one end 332a to the stabilizing link 330 and at another end 332b to the bottom of the truck box 310 at pivot 334. The first gas spring has similar characteristics as the gas spring 42 described above. The first gas spring 332 provides additional force to assist in lifting the toolbox 314 when the cover 311 is opened by pushing on the lifting mechanism 312, and to assist in lowering the toolbox 314 when the cover 311 is closed by pulling on the lifting mechanism 312.

A second pair of brackets 336, 338 may be secured to the underside of the cover 311. A second pair of connecting links 340, 342 may be coupled at one end 340a, 342a to the second pair of brackets 336, 338 and at another end 340b, 342b to the upstanding sides 318 of the tray 316. The second pair of connecting links 340, 342 may be slidably connected to one end 344a, 346a of a third pair of connecting links 344, 346. The two pairs of links are coupled by an interacting slot and pin arrangement. A pair of fixed pivots 348, 350 may be secured to either side of the truck box 310 to support the other end 344b, 346b of the third pair of connecting links 344, 346.

A third bracket 352 may be mounted to the underside of the cover 311, as shown in FIG. 13. The third bracket 352 is coupled to one end 354a of a second gas spring 354. The second gas spring 354 has similar characteristics as first gas spring 332 described above. The other end 354b of the second gas spring 354 may be secured to the toolbox 314 at fixed pivot 356. The second gas spring 354 assists in lifting the toolbox 314 when the cover 311 is opened and lowering the toolbox 314 when the cover 311 is closed. A third gas spring 358 having a similar configuration and mounting arrangement as second gas spring 354 may also be located opposite the second gas spring 354 on the truck box 310 to assist in lifting and lowering the toolbox 314.

In operation, when the cover 311 of truck box 310 is in a closed position, as shown in FIG. 14, the toolbox 314 is in a lowered position and secured inside of the truck box. When the cover 311 is opened, as shown in FIG. 13, the toolbox 314 is lifted up to an elevated position by the lifting mechanism 312 and exposed for easy access. In the elevated position, the toolbox 314 can easily be pulled out of the truck box 310 and loaded back into the truck box.

As the user opens the cover 311, the second gas spring 354 is caused to move to its extended position. As understood by those skilled in the art, the gas stored within the cylinder of the gas spring pushes against the one side of the piston of the gas spring, causing the cylinder to move away from the piston. This movement assists in the opening of the cover 311 and the lifting of the tray 316 and the toolbox 314 carried thereon from the lower, stowed position to the upward elevated position. The force of the gas spring 354 keeps the spring in the extended position and keeps the cover 311 in the open position. The third gas spring 358 works as gas spring 354 to aid in lifting the cover 311 and keeping the cover 311 in the open position.

Further, as the cover 311 is opened, the second connecting links 340, 342 are lifted up and pivoted along with the cover 311, thereby causing the toolbox 314 and tray 316 to begin moving upward. As the cover 311 is opened, the end 326b, 328b of first links 326, 328 connected to the tray 316 moves upward while the other end 326a, 328a of the links 326, 328 moves along slots 323, 324 in brackets 321, 322. This causes the tray 316 to lift the toolbox 314 substantially straight upward in a vertical direction into the elevated position. First gas spring 332 assists in moving the toolbox 314 upwardly by applying an additional upward force to link 330, thereby moving links 326, 328 upwardly. Third links 344, 346 move upwardly along with links 340, 343, and stabilize and support second links 340 and 342 in the elevated position.

When the user pushes on the cover 311 to move it back into the closed position, the gas springs 332, 354 assume their compressed positions. The first links 326, 328 move down and back along slots 323, 324. The third links 344, 346 move back down the slots in second links 340, 342, and second links 340, 342 slide back down to the original positions. The downward movement of links 326, 328 is assisted by gas spring 332. The toolbox 314 is thus lowered back inside the truck box 310.

Figure 15:
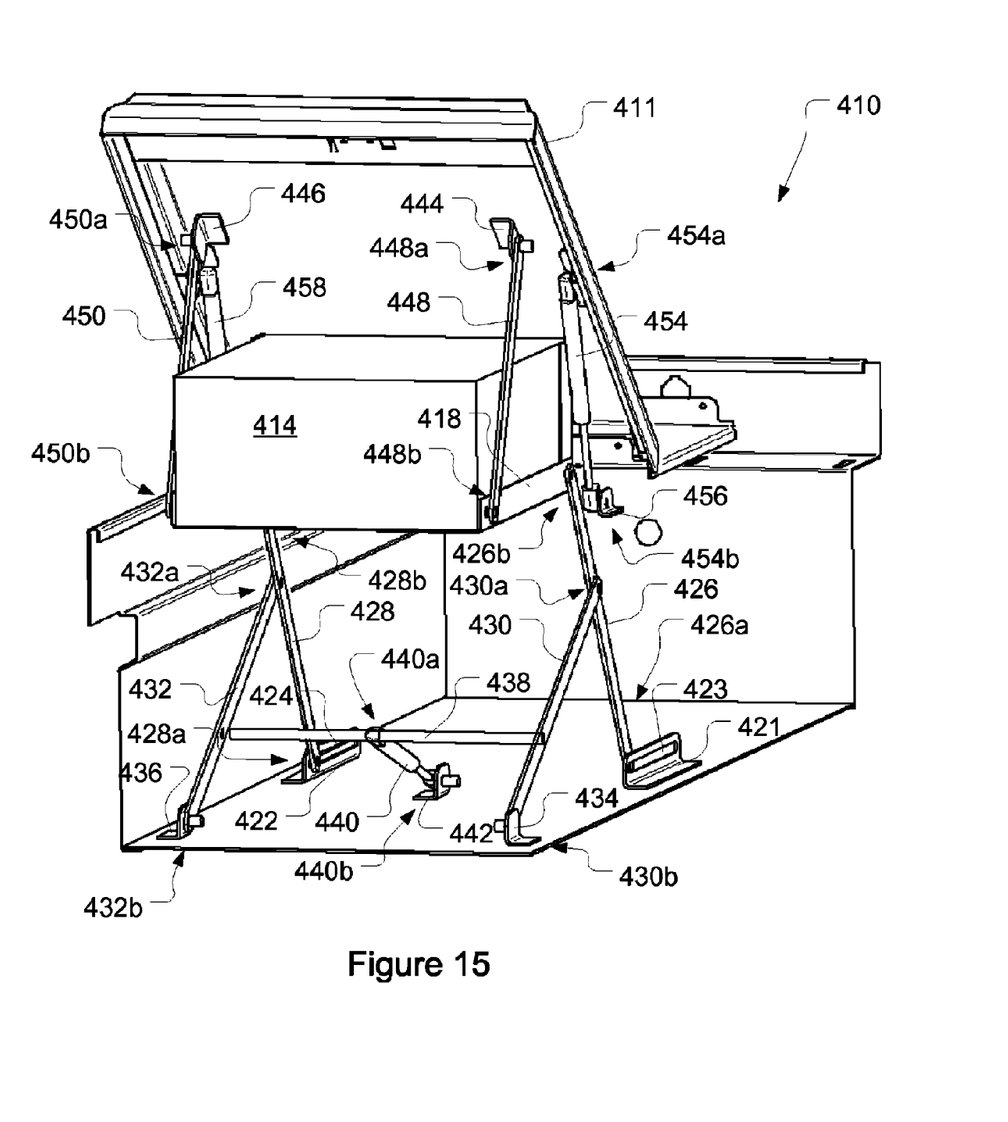
FIG. 15 is a perspective view of a fifth embodiment of a truck box having an ergonomic lift mechanism of the present invention.
Figure 16:
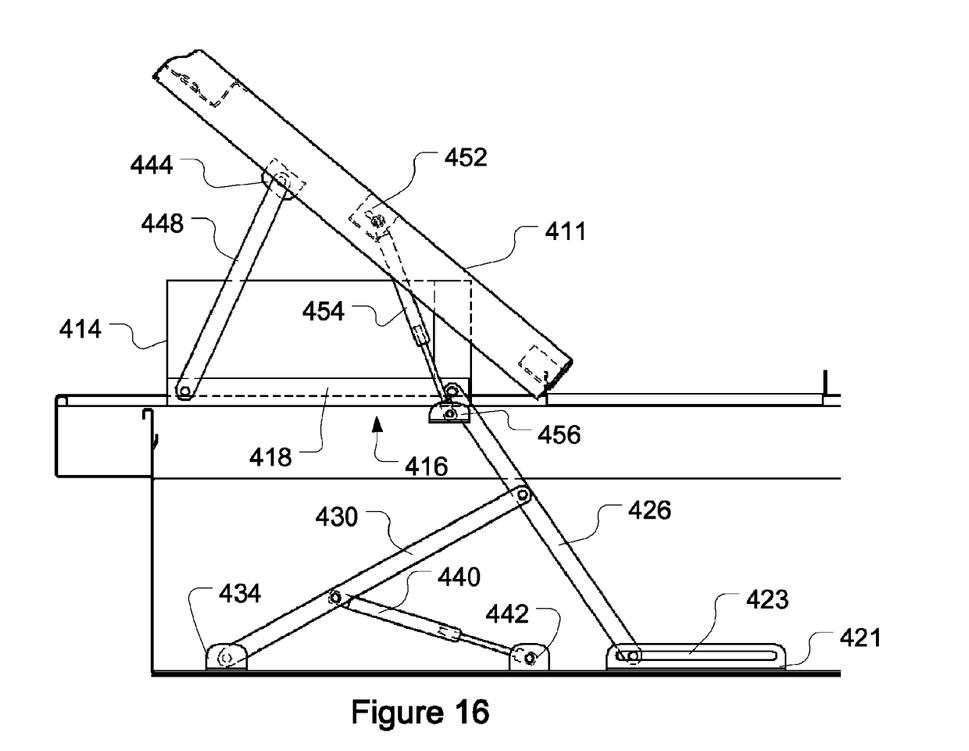
FIG. 16 is a side view of the mechanism shown in FIG. 15 in the open position.
Figure 17:
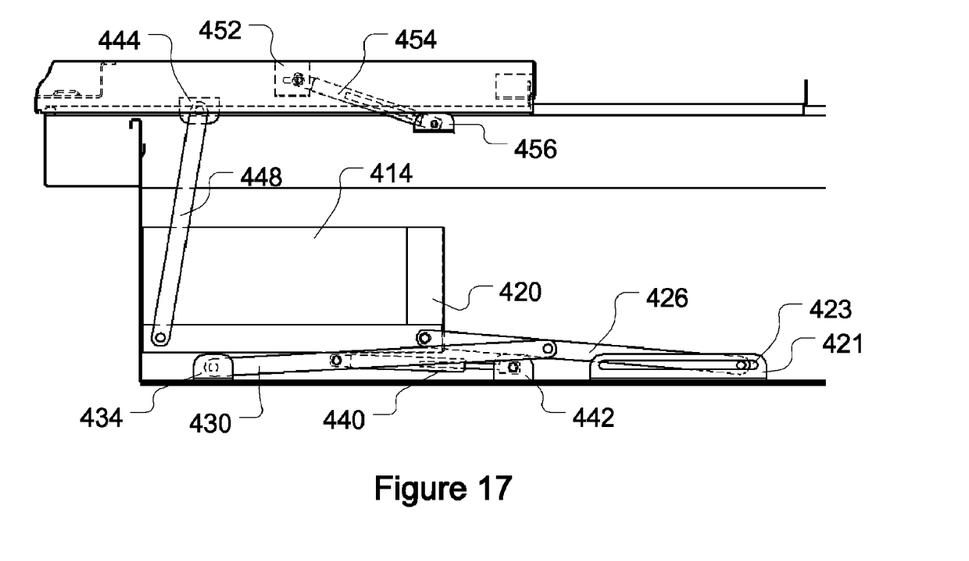
FIG. 17 is a side view of the mechanism shown in FIG. 15 in the closed position.

FIGS. 15-17 show a fifth embodiment of the lifting mechanism of the present application. In this embodiment, the lifting mechanism, generally indicated at 412 is located within truck box 410. The truck box 410 includes a cover 411. A toolbox 414 is located inside of the truck box 410 and is supported by a tray 416 which is best seen in FIGS. 16 and 17. The tray 416 may comprise a bottom portion (not shown) and at least one upstanding side portion 418 to support the toolbox 414. The tray 416 may further include a second upstanding side portion (not shown) located opposite the at least one upstanding side 418. The tray 416 may also include a back portion 420.

The lifting mechanism 412 further comprises a first pair of brackets 421, 422 mounted to a bottom of the truck box 410. The first pair of brackets 421, 422 may each include a slot 423, 424. The first pair of brackets 421, 422 may be operatively coupled to one end 426a, 428a of a first pair of connecting links 426, 428 via pins. The other end 426b, 428b of the first pair of connecting links 426, 428 may be secured to the upstanding sides 418 of the tray 416.

A second pair of connecting links 430, 432 may extend from the first pair of connecting links 426, 428 at one end 430a, 432a. The other end 430b, 432b of the second pair of connecting links 430, 432 is connected to a second pair of brackets 434, 436 secured to the bottom of the truck box 410. A stabilizing link 438 may be provided to connect the second pair of connecting links 430, 432 and provide stability to the links 430, 432.

A first gas spring 440 may be connected at one end 440a to the stabilizing link 438 and at the opposite end 440b to the bottom of the truck box 410 at pivot 442. The first gas spring has similar characteristics as gas spring 42 described above. The first gas spring 440 provides additional force to assist in lifting the toolbox 414 when the cover 411 is opened by pushing on the lifting mechanism 412, and to assist in lowering the toolbox 414 when the cover 411 is closed by pulling on the lifting mechanism 412.

A third pair of brackets 444, 446 may be mounted to the underside of the cover 411. The third pair of brackets is coupled to one end 448a, 450a of a third pair of connecting links 448, 450. The opposite end 448b, 450b of the third pair of connecting links 448, 450 may be coupled to the upstanding sides 418 of the tray 416.

A fourth bracket 452 may be secured to the underside of the cover 411, as shown in FIG. 16. The fourth bracket 452 is coupled to one end of a second gas spring 454. The second gas spring 454 has similar characteristics as first gas spring 440 described above. The other end of the second gas spring 454 may be secured to the truck box 410 at fixed pivot 456. The second gas spring 454 assists in lifting the toolbox 414 when the cover 411 is opened and lowering the toolbox when the cover 411 is closed. A third gas spring 458 having a similar configuration and mounting arrangement as second gas spring 454 may also be located opposite the second gas spring 454 on the truck box 410 to assist in lifting and lowering the toolbox 414.

In operation, when the cover 411 of truck box 410 is in a closed position, as shown in FIG. 17, the toolbox 414 is in a lowered position and secured inside of the truck box. When the cover 411 is opened, as shown in FIG. 16, the toolbox 414 is lifted up to an elevated position by the lifting mechanism 412 and exposed for easy access. In the elevated position, the toolbox 414 can easily be pulled out of the truck box 410 and loaded back in.

As the user opens the cover 411, the second gas spring 454 is caused to move to its extended position. As understood by those skilled in the art, the gas stored within the cylinder of the gas spring pushes against the one side of the piston of the gas spring, causing the cylinder to move away from the piston. This movement assists in the opening of the cover 411 and the lifting of the tray 416 and the toolbox 414 carried thereon from the lower, stowed position to the upward elevated position. The force of the gas spring 454 keeps the spring in the extended position and keeps the cover 411 in the open position. The third gas spring 458 works as second gas spring 454 to aid in lifting the toolbox 414 and keeps the cover 411 in the open position.

Further, as the cover 411 is opened, the connecting links 448, 450 pivot along with the cover 411, which lifts the toolbox 414 and tray 416 up. As the toolbox 414 moves up, first links 426, 428 move along slots 423, 424 in brackets 421, 422. This causes the second links 430, 432 to move upward. The upward movement of the second links 430, 432 is assisted by first gas spring 440. The movement of the links 426, 428, 430, and 432 causes the tray 416 to lift the toolbox 414 substantially straight upward in a vertical direction into the elevated position.

When the user pushes on the cover 411 to move it back into the closed position, the gas springs 440, 454 assume their compressed positions. The downward movement of the cover 411 causes links 448, 450 to move downwardly, and also causes links 426, 428 to move downwardly and to slide back along slots 423, 424. The movement of links 426, 428 in turn causes links 430, 432 to move downwardly. The downward movement of links 430, 432 is assisted by gas spring 440. Thus, the toolbox 414 is lowered back inside the truck box 410.

Figure 18:
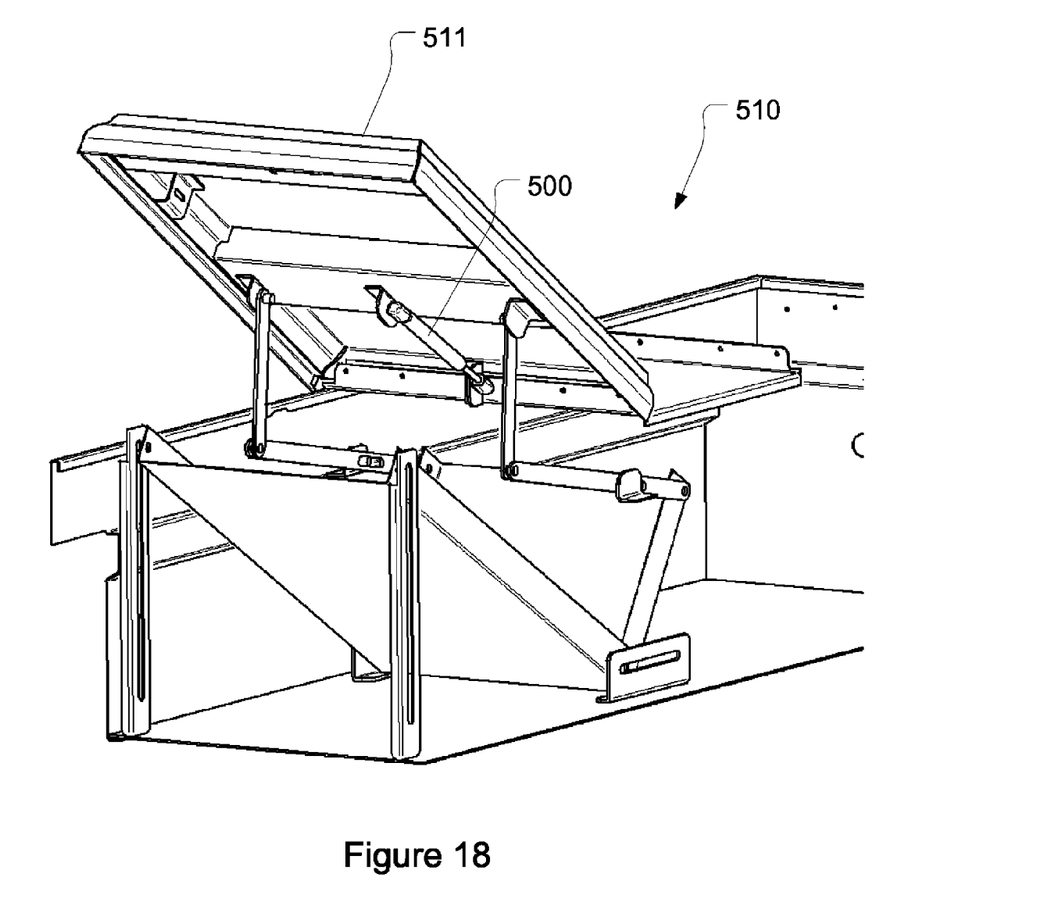
FIG. 18 is a perspective view of another embodiment of a truck box having an ergonomic lift mechanism with a single lift assist.

The embodiments discussed above are provided with two gas springs positioned along either side of the cover. It is possible to utilize a single gas spring 500 to lift and lower the tray and toolbox, as shown in the alternate embodiment of FIG. 18. The single gas spring 500 may be mounted to the center of the cover 511 at one end and to the center of the body of the truck box 510 at the other end to ensure a balanced force.

The various embodiments of the present invention are depicted with a gas spring as a lift assist. The lift assist could take alternate forms such as a pneumatic cylinder, a hydraulic cylinder, a compression spring, or a tension spring, for example. Furthermore, each embodiment could also include only lift assist connected to the cover to assist in lifting and lowering the cover and the tray, as described above and shown in FIG. 18.

It should be understood that the components of the lifting mechanism are not limited to the embodiments shown. Additional components that could be included in the lifting mechanism include tension springs, fulcrums, bearings, and stoppers.

Furthermore, it should be understood that the pairs of brackets mentioned above may take alternate forms, provided that the toolbox and cover are allowed to move as required. For example, the brackets 21, 22 could take the form of a single member that extends across the side portions of the tray. Similarly, brackets 24, 26 could take the form of a single bracket.

In addition, it should be understood that while FIG. 1 depicts only a single lifting mechanism, a second lifting mechanism could be provided on the other side of the truck box. Further, the lifting mechanism is not limited in its application to the particular truck box depicted in FIG. 1. The invention can be applied in other designs of truck boxes.

While certain features and embodiments of the present application have been described in detail herein, it is to be understood that the application encompasses all modifications and enhancements within the scope and spirit of the following claims.

We claim:

1. A truck box assembly comprising:
   an outer box having a cover, a bottom, a first end and a second end, wherein the cover opens away from the first end of the outer box;
   a lifting mechanism, the lifting mechanism comprising:
      a tray adapted to support an inner container, the tray including a first end and a second end, wherein the first end is adjacent to the first end of the outer box;
      a link coupled to the cover and to the tray for guiding the tray between an elevated position and a lowered position; and
      a lift assist coupled to an attachment point on the cover to assist in moving the tray between the elevated position and the lowered position;
   wherein when the tray is moved into the elevated position, the first end of the tray moves from the bottom of the outer box toward the cover.

2. The truck box assembly of claim 1 wherein the lift assist comprises a gas spring.

3. The truck box assembly of claim 1 wherein the lift assist is adapted for mounting to the outer box.

4. The truck box assembly of claim 1 further comprising a bracket adapted for mounting to the cover, the link coupled to one end of the bracket.

5. The truck box assembly of claim 1 wherein the tray includes a slot for coupling with the link.

6. The truck box assembly of claim 1 wherein the tray includes at least one upstanding side.

7. The truck box assembly of claim 1 wherein in the elevated position the tray is at an angle with respect to the bottom of the outer box.

8. The truck box assembly of claim 1 wherein in the elevated position the tray is substantially parallel to the bottom of the outer box.

9. The truck box assembly of claim 1 further comprising a second lift assist provided at the bottom of the outer box.

10. The truck box assembly of claim 1 further comprising an inner container to be supported by the tray.

11. The truck box assembly of claim 10 wherein the inner container is a toolbox.

12. The truck box assembly of claim 1 further comprising a bracket adapted for mounting to a bottom of the outer box, the bracket allowing the tray to move between the elevated and the lowered position.

13. The truck box assembly of claim 12 wherein the bracket adapted for mounting to a bottom of the outer box is a slotted bracket.

14. The truck box assembly of claim 12 wherein the bracket adapted for mounting to a bottom of the outer box is fixed to the tray.

15. The truck box assembly of claim 12 further comprising a second bracket adapted for mounting to the cover, the link coupled to one end of the second bracket.

16. The truck box assembly of claim 15 wherein the second bracket is a slotted bracket.

17. The truck box assembly of claim 15 further comprising a third bracket adapted for mounting to the outer box at a distance away from the bracket adapted for mounting to a bottom of the outer box.

18. The truck box assembly of claim 17 wherein the third bracket is a slotted bracket.

19. The truck box assembly of claim 17 wherein the third bracket is secured to the tray.

20. The truck box assembly of claim 17 wherein the third bracket is coupled to a second link.

21. The truck box assembly of claim 20 further comprising a third link coupled to the tray.

22. A truck box assembly comprising:
    an outer box having a cover, a bottom, a first end and a second end, wherein the cover opens away from the first end of the outer box;
    a lifting mechanism, the lifting mechanism comprising:
       a tray adapted to support an inner container, the tray including a first end and a second end, wherein the first end is adjacent to the first end of the outer box;
       a slotted link coupled to the cover and to the tray for guiding the tray between an elevated position and a lowered position; and
       a lift assist coupled to an attachment point on the cover to assist in moving the tray between the elevated position and the lowered position,
    wherein when the tray is moved into the elevated position, the first end of the tray moves from the bottom of the outer box toward the cover.

23. The truck box assembly of claim 22 wherein the slotted link is an L-shaped slotted link.

24. The truck box assembly of claim 22 wherein the slotted link includes a locking mechanism to lock the lifting mechanism in the elevated position.

25. The truck box assembly of claim 22 further comprising at least one support on a bottom of the outer box for supporting the tray in the lowered position.

26. The truck box assembly of claim 22 wherein the tray further comprises a roller to assist in removal of the inner container from the tray.

27. The truck box assembly of claim 22 wherein the lift assist comprises a gas spring.

28. The truck box assembly of claim 27 wherein one end of the gas spring is adapted for mounting to the outer box.

29. The truck box assembly of claim 22 further comprising an inner container to be supported by the tray.

30. The truck box assembly of claim 29 wherein the inner container is a toolbox.

* * * * *